US008794986B2

(12) United States Patent
Takasaki et al.

(10) Patent No.: US 8,794,986 B2
(45) Date of Patent: Aug. 5, 2014

(54) CONNECTOR

(71) Applicant: Molex Incorporated, Lisle, IL (US)

(72) Inventors: Masamitsu Takasaki, Yamato (JP); Yuji Naito, Yamato (JP); Mitsuhiro Tomita, Yamato (JP); Naoto Yoshikawa, Yamato (JP)

(73) Assignee: Molex Incorporated, Lisle, IL (US)

( * ) Notice: Subject to any disclaimer, the term of this patent is extended or adjusted under 35 U.S.C. 154(b) by 25 days.

(21) Appl. No.: 13/727,938

(22) Filed: Dec. 27, 2012

(65) Prior Publication Data

US 2014/0017920 A1 Jan. 16, 2014

(30) Foreign Application Priority Data

Dec. 27, 2011 (JP) .................. 2011-286681

(51) Int. Cl.
*H01R 13/62* (2006.01)
(52) U.S. Cl.
USPC ........................................... 439/157
(58) Field of Classification Search
USPC .................. 439/157, 159–160
See application file for complete search history.

(56) References Cited

U.S. PATENT DOCUMENTS

| 7,374,440 | B2 * | 5/2008 | Chen et al. ............ 439/159 |
| 7,867,034 | B1 * | 1/2011 | Sato et al. ............. 439/630 |
| 2003/0017732 | A1 * | 1/2003 | Hsu .................... 439/157 |
| 2004/0005799 | A1 * | 1/2004 | Okabe ................. 439/157 |

FOREIGN PATENT DOCUMENTS

JP 2003-296729 A 3/2005

* cited by examiner

*Primary Examiner* — Jean F Duverne
(74) *Attorney, Agent, or Firm* — Timothy M. Morella

(57) ABSTRACT

The housing has a guide rail protruding from the upper face of the bottom wall portion and extending towards the rear end portion. The guide rail includes a wide portion near the front end portion and a narrow portion near the rear end portion being narrower in width than the wide portion. The sliding portion has a recessed guide groove slidably engaging the guide rail. The guide groove engages the wide portion when the card-type unit is in the locked position and engages the narrow portion instead of the wide portion when the card-type unit is in the ejection position.

6 Claims, 15 Drawing Sheets

CONNECTOR

REFERENCE TO RELATED APPLICATIONS

The Present Disclosure claims priority to Japanese Patent Application No. 2011-286681, entitled "Connector," and filed 27 Dec. 2011 with the Japanese Patent Office. The content of this Application is incorporated in its entirety herein.

BACKGROUND OF THE PRESENT DISCLOSURE

The Present Disclosure relates, generally, to a connector.

Electronic devices typically include card connectors to allow various types of memory cards to be used. In order to make them easier to use, connectors are increasingly equipped with a push/push structure, in which a memory card is pushed in to both insert and remove the memory card. In such connectors, a sliding member engaging and holding the memory card is moved by the rebound force of a spring when the memory card is ejected. However, it is difficult to remove the memory card because the memory card and sliding member do not disengage.

However, a technique has been proposed in which the sliding member is configured so as to be able to swing, and the sliding member is swung to disengage the memory card and the sliding member when the memory card is ejected. An example is disclosed in Japanese Patent Application No. 2003-296729, the content of which is hereby incorporated herein in its entirety.

FIG. 15 is a planar view of a conventional connector. In FIG. 15, 811 is the housing of the connector which is made of an insulating material, and this housing has a plurality of metal connecting terminals 851. Also, 861 is the shell of the connector which is a metal plate and is mounted on the upper side of the housing 811. A memory card 901 is inserted into the space between the shell 861 and the housing 811, and the connecting terminals 851 make contact with the corresponding contact pads (not shown), arranged on the front end of the memory card 901.

A card guiding mechanism is arranged in a side portion of the housing 811, and the sliding member 821 in the card guiding mechanism has a first engaging member 821a and a second engaging member 821b which engage an engaging recessed portion 972 formed in the side face of the memory card 901 and the front corners of the memory card 901 to hold the memory card 901 while sliding vertically in the drawing. The sliding member 821 is biased in the ejection direction of the memory card 901 (upward in the drawing) by a coil spring 882. Also, a heart-shaped cam groove 822 is formed in the upper face of the sliding member 821, and the free end of a pin member 881 is engaged in the cam groove 822. In this way, a memory card 901 can be inserted and ejected using a so-called push/push operation.

Here, a first guide 815A and a second guide 815B extending vertically in the drawing are formed in the bottom wall of the housing 811. Recessed portions not shown in the drawing are formed in the bottom face of the sliding member 821 to engage the first guide 815A and the second guide 815B. In this way, the sliding member 821 can smoothly slide along the two parallel guides, the first guide 815A and the second guide 815B.

A protrusion (not shown) is formed on the upper end of the first guide 815A in the drawing. When the sliding member 821 moves in the ejection direction and reaches the position shown in the drawing, the recessed portion in the bottom face of the sliding member 821 is caught by the protrusion. Because a protrusion is not formed in the second guide 815B, the recessed portion in the bottom face of the sliding member 821 can move through the second guide 815B. Therefore, when the sliding member 821 is moved in the ejection direction beyond the position shown in the drawing, the sliding member 821 rotates counterclockwise around the protrusion. This disengages the first engaging member 821a of the sliding member 821 from the engaging recessed portion 972 of the memory card 901. Then, the memory card 901 is released from the hold of the sliding member 821, and can be easily removed.

In a conventional connector, two parallel guides have to be formed in the bottom wall of the housing 811, the first guide 815A and the second guide 815B. As a result, the width dimension of the housing 811 has to be increased. The width dimension has to be further increased because the sliding member 821 slides along the two rails. Thus, the overall width dimension of the connector has to be increased and it becomes more difficult to make the connector more compact.

SUMMARY OF THE PRESENT DISCLOSURE

The purpose of the Present Disclosure is to solve the problem associated with the prior art by providing a compact, reliable connector with a reduced width dimension able to hold a card-type unit securely, and allowing for easy ejection of the card-type unit using a simple configuration.

The Present Disclosure is a connector having a housing accommodating a card-type unit having a terminal member on one face; a connecting terminal mounted in the housing and contacting the terminal member of the card-type unit; a card guiding mechanism having a sliding member holding a card-type unit inserted into the housing from the rear end portion towards the front end portion and sliding, and a biasing member biasing the sliding member towards the rear end portion, the card-type unit being held at a locked position with contact maintained between the terminal member of the card-type unit and the connecting terminal, and the biasing force of the biasing member moving the sliding member from a final end point towards the rear end portion and advancing the card-type unit to an ejection position when the card-type unit is moved towards the front end portion to the final end point by a push operation pushing the card-type unit held at the locked position towards the front end portion; and a cover member mounted in the housing covering the sliding member and at least a portion of the card-type unit inserted into the housing. In this connector the housing has a guide rail protruding from the upper face of the bottom wall portion and extending towards the rear end portion, the guide rail including a wide portion near the front end portion and a narrow portion near the rear end portion being narrower in width than the wide portion; and the sliding portion has a recessed guide groove slidably engaging the guide rail, the guide groove engaging the wide portion when the card-type unit is in the locked position, and engaging the narrow portion instead of the wide portion when the card-type unit is in the ejection position.

In another connector of the Present Disclosure, the card-type unit has an engaging protruding portion protruding from a side face, and the sliding member has an engaging recessed portion recessed in a side face. Here, the engaging recessed portion engages the engaging protruding portion to hold the card-type unit. In another connector, the sliding member cannot become displaced outward in the width direction of the housing when the card-type unit is in the locked position, but can become displaced outward in the width direction of the housing when the card-type unit is in the ejection position. In another connector, the narrow portion of the guide rail has a side face in the center of the housing in the width direction, and the side face is an inclined face which becomes more inclined outward in the width direction of the housing as the rear end portion is approached. In another connector, the card-type unit includes a card having a terminal member on one face, and a card tray containing a card so as to expose the terminal member. In another connector, the card tray has a top panel portion facing the side of the card opposite that of the terminal member, a front panel portion extending upright from the front edge of the top panel portion and facing the front end of the card, a rear panel portion extending upright from the rear edge of the top panel portion and facing the rear end of the card, a notch portion formed in the front panel portion so at least a portion of the front end of the card is exposed, and a card holding spring portion disposed near the rear panel portion and biasing the card forward to press the front end of the card into a portion of the front panel portion other than the notch portion, the card being grasped longitudinally to expose the entire face of the card on the terminal member side.

The Present Disclosure is able to provide a compact, reliable connector with a reduced width dimension able to hold a card-type unit securely, and allowing for easy ejection of the card-type unit using a simple configuration.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 2 shows four views of the card tray of FIG. 1, in which FIG. 2(a) is a rear view, FIG. 2(b) is a bottom view, FIG. 2(c) is a front view and FIG. 2(d) is a side view;

FIG. 4 shows perspective views of the card tray of FIG. 1, in which FIG. 4(a) is a perspective view from the front and FIG. 4(b) is a perspective view from the rear;

FIG. 6 shows four views of the card connector of FIG. 5, in which FIG. 6(a) is a rear view, FIG. 6(b) is a bottom view, FIG. 6(c) is a front view and FIG. 6(d) is a side view;

FIG. 9 shows perspective views showing the operation when a card-type unit is inserted into a card connector according to an embodiment of the Present Disclosure, in which FIG. 9(a) is the view before insertion and FIG. 9(b) is the view after insertion;

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Referring to the Figures, 101 is the card-type unit according to the present embodiment, which is inserted into a card connector 1 described below mounted in an electronic device (not shown). In other words, the card-type unit 101 is mounted in the electronic device via the card connector 1. The card-type unit 101 may be any type of unit able to be inserted into the card connector 1 to establish a connection with the electronic device via the card connector 1. In the explanation of the present embodiment, the card-type unit 101 is a card tray 161 containing a card 102 as shown in FIG. 1.

Figure 1:
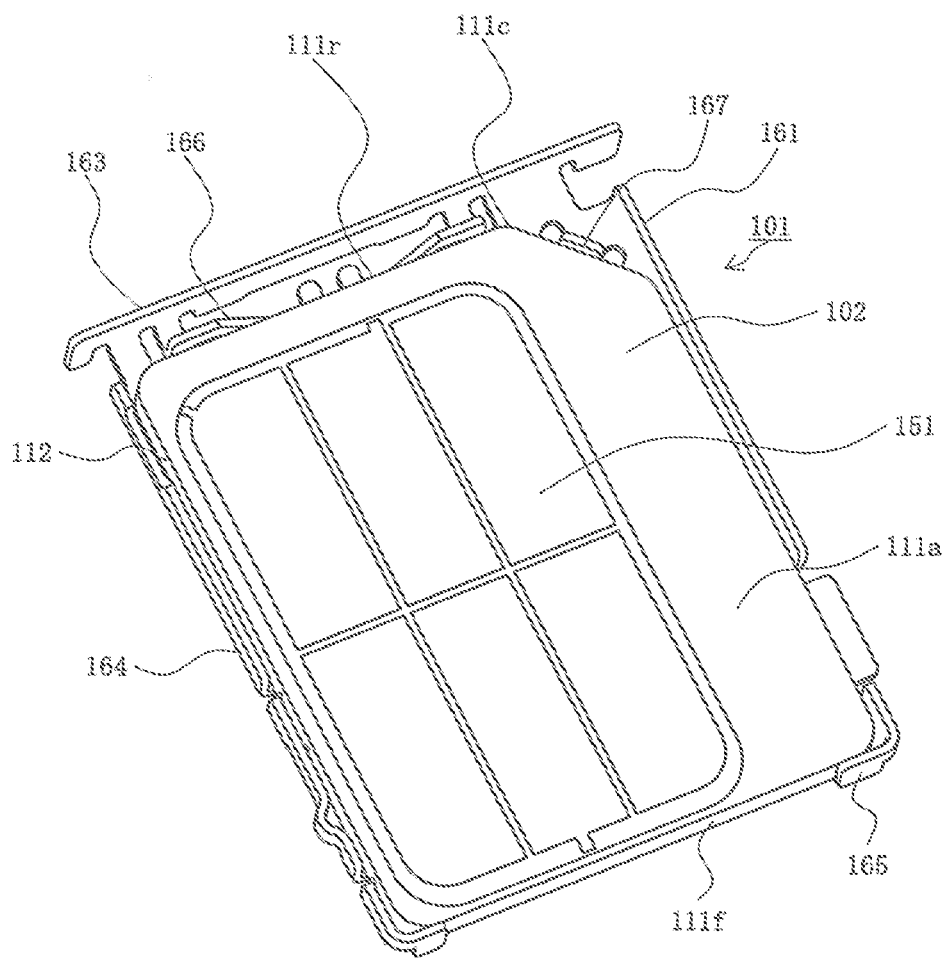
FIG. 1 shows a perspective view showing a card-type unit according to an embodiment of the Present Disclosure.

The card 102, as shown in FIG. 1, has a substantially rectangular shape. The contact pads 151 serving as electrode pads are arranged on the bottom face 111a of the card in rows along the front end 111b and the rear end 111r. In the example shown, three are arranged in two rows. In other words, the contact pads 151 are disposed in two rows extending in the width direction of the card 102. Contact pads 151 are not disposed on the top face on the opposite side from the bottom face 111a. A notch portion 111c is formed in one corner where a side edge 112 meets the left or right rear end 111r. Here, the rear right corner of the bottom face 111a is cut off at an angle.

Here, the card tray 161 is a member formed by punching or bending a metal plate, and has a substantially rectangular top panel portion 162, a pair of side panel portions 164 extending longitudinally along the side edge of the top panel portion 162 and extending downward from the side edge of the top panel portion 162, a front panel portion 165 extending widthwise along the front edge of the top panel portion 162 and extending downward from the front edge of the top panel portion 162, and a rear panel portion 163 extending widthwise along the rear edge of the top panel portion 162 and extending downward from the rear edge of the top panel portion 162. As shown in FIG. 1, when a card 102 is accommodated inside, the top panel portion 162 regulates the position in the thickness direction of the card 102 opposite the upper face of the card 102 (the face on the opposite side from the contact pads 151), the side panel portions 164 regulate the position of the card 102 in the width direction (short axis direction) opposite the side edges 112 of the card 102, and the front panel portion 165 and the rear panel portion 163 regulate the position of the card 102 in the length direction (long axis direction) opposite the front end 111*f* and rear end 111*r* of the card 102. The card tray 161 does not have a bottom panel portion. In other words, there is no member on the side opposite the top panel portion 162, and the bottom face 111*a* of the accommodated card 102 is exposed. In the present embodiment, the end portion in the forward direction when inserted into the card connector 1 (the lower end in FIG. 3) is the front end 161F, and, in the reverse direction (the upper end in FIG. 3), is the rear end 161R.

Figure 2:
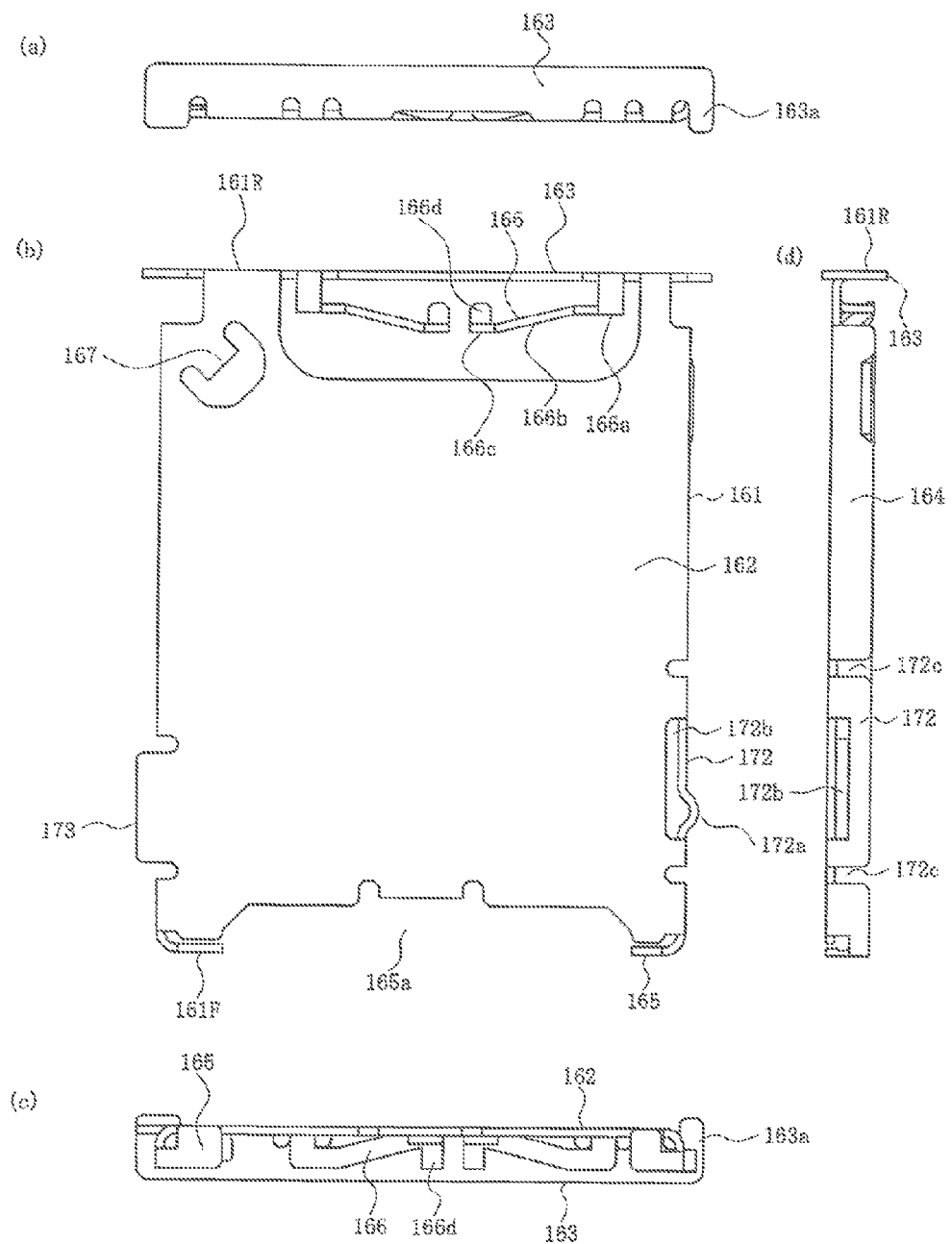

A notch portion 165*a* of a predetermined width is formed in the front panel portion 165 located at the front end 161F of the card tray 161, and at least a portion of the front end 111*f* of the card 102 is exposed at the front end 161F via the notch portion 165*a*. In the example, more than half including the center line of the front panel portion 165 in the width direction is the notch portion 165*a*, and the portion of the front end plate 165 outside of the notch portion 165*a* is at both ends of the top panel portion 162 in the width direction, that is, near the side panel portions 164 on the left and right sides. The position and size of the notch portion 165*a* can be changed if necessary. However, the notch portion 165*a* is preferably formed so that no front panel portion 165 remains in the portion corresponding to the portion of the card connector 1 in which the terminals 51 described below are disposed. In this way, when it is inserted into the card connector 1, the front panel portion 165 does not interfere with the terminals 51 and the terminals 51 are reliably kept from being damaged. As shown in FIG. 2(*b*), the notch portion 165*a* preferably includes a portion near the front edge of the top panel portion 162. In other words, a portion near the front edge of the top panel portion 162 is preferably notched.

An elastic arm portion 166 is disposed as a card holding spring portion in a position near the rear panel portion 163 located at the rear end 161R of the card tray 161. The elastic arm portion 166 is integrally formed with the rear panel portion 163, and has a mounting portion 166*a* mounted on the rear panel portion 163, a cantilevered main portion 166*b* whose base end is connected to the mounting member 166*a* and which extends laterally, an abutting portion 166*c* connected to the free end of the main portion 166*b*, and a guiding portion 166*d* connected to the bottom end of the abutting portion 166*c*. The abutting portion 166*c* biases the rear end 111*r* of the card 102 accommodated inside the card tray 161 forward due to the spring action of the main portion 166*b*, and the front end 111*f* of the card 102 is pressed into the abutting portion 165*c*, which is the inner face of the front panel portion 165. As a result, the card 102 is pinched longitudinally between the abutting portion 166*c* of the elastic arm portion 166 and the abutting portion 165*c* of the front panel portion 165. In other words, the card 102 is elastically gripped longitudinally due to the spring action of the elastic arm portion 166. As a result, the card 102 accommodated inside the card tray 161 does not come out of the card tray 161 even though the bottom of the card tray 161 is open.

Recessed grooves form an uneven portion in the abutting portion 166*c* of the elastic arm portion 166, and recessed grooves form an uneven portion in the abutting portion 165*c* of the front panel portion 165. These increase the friction between the abutting portion 166*c* of the elastic arm portion 166 and the rear end 111*r* of the card 102 and the friction between the abutting portion 165*c* of the front panel portion 165 and the front end 111*f* of the card 102. This also displaces the card 102 accommodated inside the card tray 161 downward, and keeps the card 102 from coming out of the card tray 161.

When a card 102 is accommodated inside the card tray 161, the guiding portion 166*d* guides the rear end 111*r* of the card 102 towards the abutting portion 166*c*, and a smooth round curved surface is provided so that the rear end 111*r* of the card 102 can slide smoothly. In other words, the guiding portion 166*d* is R-shaped.

When a card 102 is set into the card tray 161, the user usually inserts the card 102 into the card tray 161 from the rear end 111*r*. In other words, the card 102 is inclined towards the top panel portion 162 of the card tray 161, the rear end 111*r* is inserted into the card tray 161 and comes into contact with the top panel portion 162 and comes into contact with the abutting portion 166*c* of the elastic arm portion 166. When the user applies pressure to the card 102 towards the rear end 161R of the card tray 161, the elastic arm portion 166 is elastically deformed and the abutting portion 166*c* of the elastic arm portion 166 is elastically deformed towards the rear panel portion 163. As a result, the entire card 102 is displaced towards the rear end 161R of the card tray 161 in the card tray 161, and the front end 111*f* is positioned to the rear of the front panel portion 165 of the card tray 161. Next, the user inserts the front end 111*f* of the card 102 into the card tray 161, which abuts the top panel portion 162, and the pressure applied to the rear end 161R of the card tray 161 is released. When this occurs, the spring action of the elastic arm portion 166 elastically displaces the abutting portion 166*c*, and separates it from the rear panel portion 163. As a result, the entire card 102 is displaced towards the front end 161F of the card tray 161 in the card tray 161 and the front end 111*f* abuts with the front panel end 165 of the card tray 161. In this way, the setting of the card 102 in the card tray 161 is complete, and the card 102 is accommodated inside the card tray 161 as shown in FIG. 1.

However, because there is an R-shape in the guiding portion 166*d*, the card 102 can be inserted into the card tray 161 from the front end 111*f* instead of inserting the card 102 into the card tray 161 from the rear end 111*r*. More specifically, the user first inclines the card 102 towards the top panel portion 162 of the card tray 161, and inserts the front end 111*f* into the card tray 161 until the top panel portion 162 is abutted and the front panel portion 165 is abutted. Next, the user inserts the rear end 111*r* of the card 102 into the card tray 161. In other words, the rear end 111*r* is displaced towards the rear panel portion 162. Then, the rear end 111*r* abuts the guiding portion 166*d* of the elastic arm portion 166. When the user applies pressure to the rear end 111*r* towards the top panel portion 162, the rear end 111*r* is displaced towards the top panel portion 162 along the guiding portion 166*d*, and the guiding and abutting portions 166*d*, 166*c* connected to the guiding portion 166*d* resist the spring action of the elastic arm portion 166 and are displaced closer to the rear panel portion 163. At this time, the surface of the guiding portion 166*d* can smoothly displace the rear end 111*r* towards the top panel portion 162 because the surface of the guiding portion 166*d* is a smooth curved face. Finally, when the rear end 111*r* abuts the top panel portion 162, the setting of the card 102 into the card tray 161 is complete.

When the card 102 is to be removed from the card tray 161, the user pressure to the front end 111*f* in the direction separating the card tray 161 from the top panel portion 162. Preferably, pressure is also applied towards the rear end 161R of the card tray 161. Because a notch portion 165*a* has been formed in the front panel portion 165 of the card tray 161, the user can easily apply pressure to the front end 111*f* of the card 102.

A positioning claw portion 167 extending downward is formed in the corner where a side edge joins a rear edge of the top panel portion 162, more specifically, in the rear right corner. The positioning claw portion 167 functions as a card orientation regulating portion. When the card 102 is inserted properly as shown in FIG. 1, it allows the card 102 to be accommodated inside the card tray 161. However, when the card 102 is inserted improperly, it does not allow the card 102 to be accommodated inside the card tray 161. In other words, the card 102 cannot be accommodated inside the card tray 161. More specifically, the positioning claw portion 167 is formed to face the notch portion 111*c* of a card 102 accommodated properly inside the card tray 161. Therefore, when a card 102 is inserted into the card tray 161 improperly, the bottom face 111*a* or top face of the card 102 comes into contact with the positioning claw portion 167, and the card 102 cannot be inserted and accommodated inside the card tray 161.

The card tray 161 in the present embodiment is accommodated and held so that the bottom face 111*a* of the card 102 on which the contact pads 151 are disposed faces the side opposite that of the top panel portion 162. As a result, the top panel portion 162 does not require a large opening. Therefore, the strength and rigidity of the top panel portion 162 is not reduced, and the overall strength and rigidity of the card tray 161 can be maintained.

The height dimension of the side panel portion 164 and front panel portion 165, that is, the dimension in the vertical direction (the longitudinal direction in FIG. 2(*d*)) is smaller than the thickness dimension of the card 102. In this way, when inserted into the card connector 1, the lower ends of the side panel portion 164 and the front panel portion 165 are positioned above the bottom face 111*a* of the card 102, and the lower ends of the side panel portion 164 and the front panel portion 165 do not abut the bottom wall portion 11*b* of the housing 11 of the card connector 1 described below. Thus, components such as the terminals 51 disposed on the bottom wall portion 11*b* of the housing 11 are not damaged.

The height dimension of the rear panel portion 163 is greater than the thickness dimension of the card 102, and preferably greater than the thickness dimension of the insertion opening 18 of the card connector 1, described below. The panel end portions 163*a* on the ledge and right sides of the rear panel portion 163 function as insertion preventing portions. Therefore, at least the height dimension of the panel portion 163*a* is greater than the thickness dimension of the insertion opening 18. This reliably prevents insertion of the card tray 161 into the card connector 1 from the insertion opening 18 with the wrong orientation.

The card tray 161 also has a protruding piece 173 as an insertion preventing portion. The protruding piece 173 protrudes outward from a side edge (the right side edge in FIG. 3) of the top panel portion 162 near the front end 161F, and is flush with the top panel portion 162. An insertion allowing slit 18*a* is formed in the end of the insertion opening 18 of the card connector 1 which allows for insertion of the protruding piece 173 when the card tray 161 is oriented properly. In this way, the card tray 161 can be reliably prevented from being inserted into the card connector 1 from the insertion opening 18 with the wrong orientation.

Figure 3:
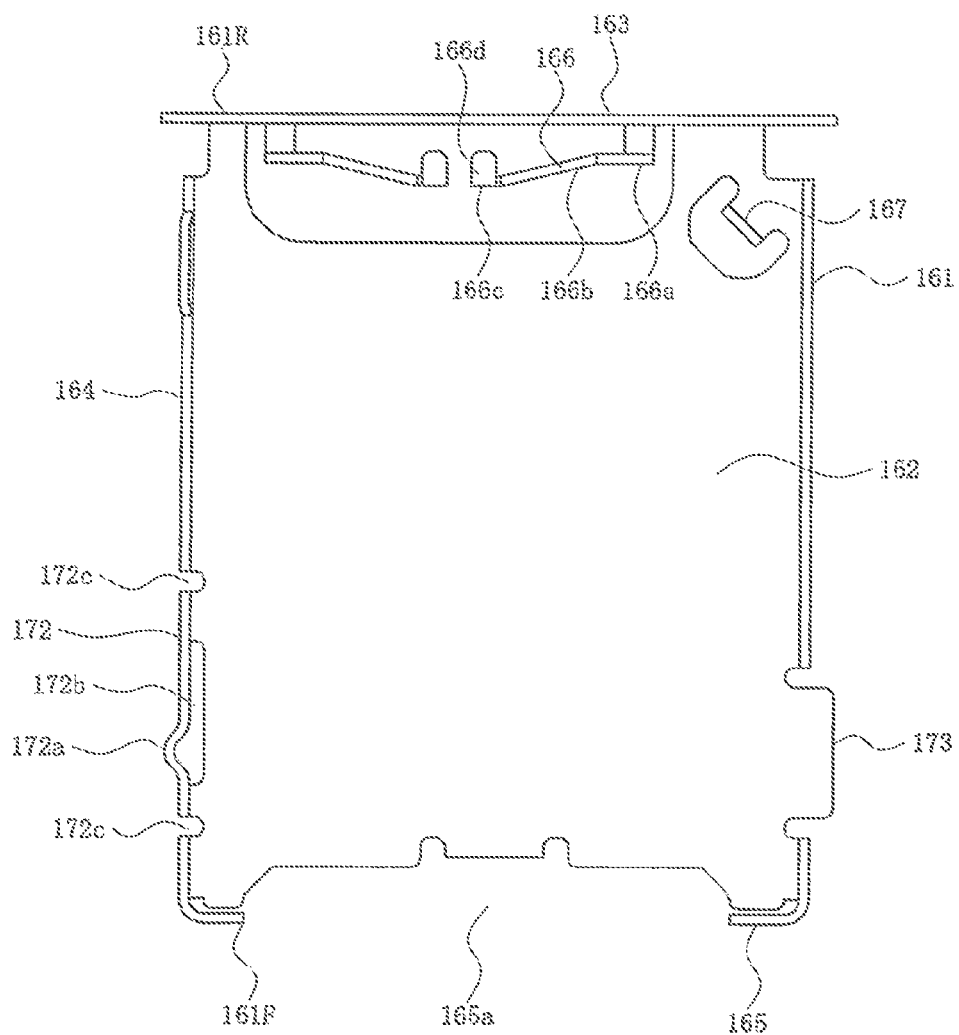
FIG. 3 shows a top view of the card tray of FIG. 1.
Figure 4:
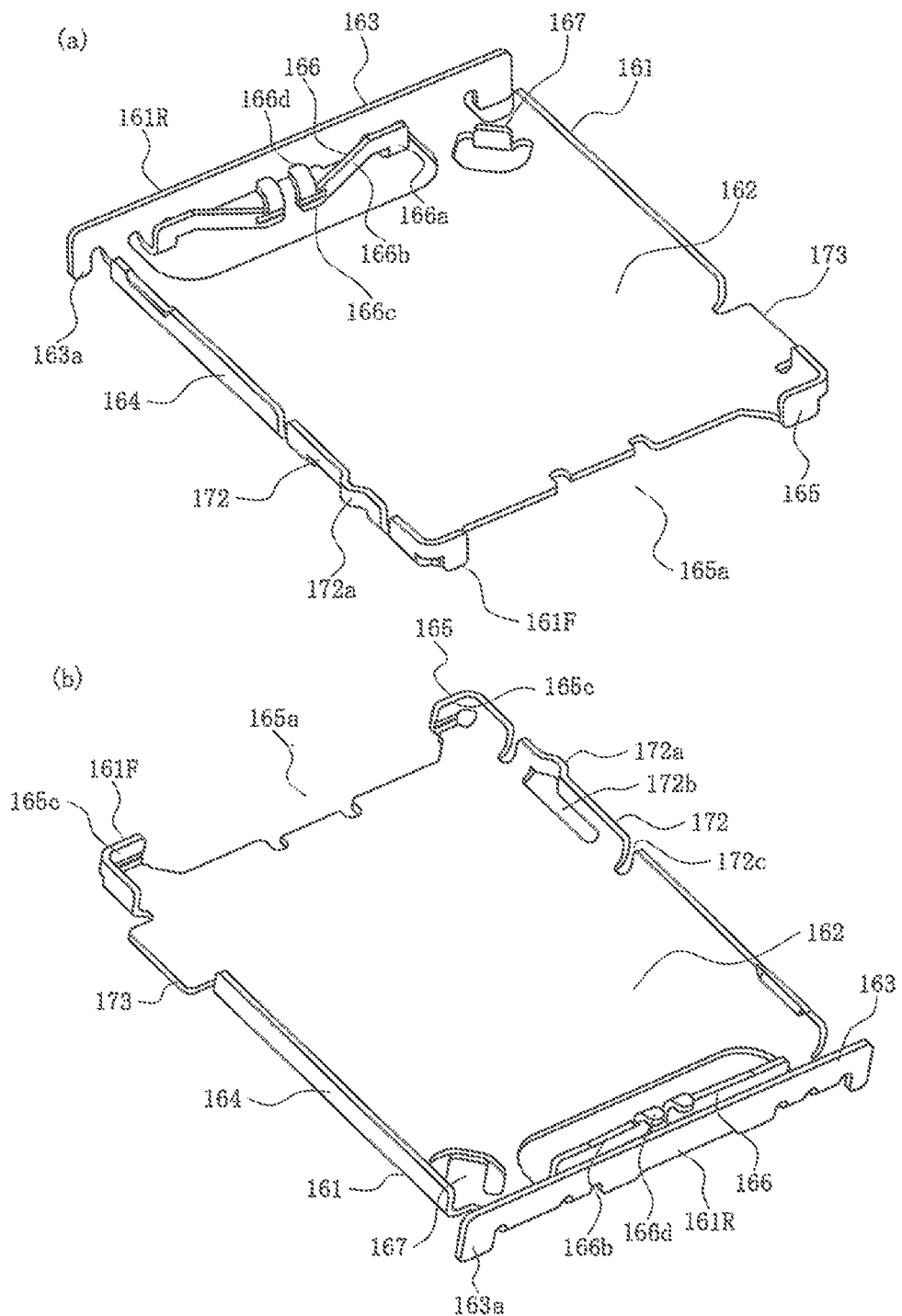

The card tray 161 has an engaging portion 172 formed independently from the side panel portion 164 on one side edge of the top panel portion 162 (the left side edge in FIG. 3). The engaging portion 172 engages the sliding portion 21 of the tray guiding mechanism, described below, when inserted into the card connector 1, and includes an engaging protruding portion 172*a*. More specifically, the engaging portion 172 runs longitudinally along the side edge of the top panel portion 162, and extends downward from the top panel portion 162. It is substantially flush with the side panel portion 164, but is separated from the side panel portion 162 by a separating slit 172*c*. In this way, the engaging portion 172 can be elastically deformed and smoothly engaged with and disengaged from the sliding member 21.

Figure 6:
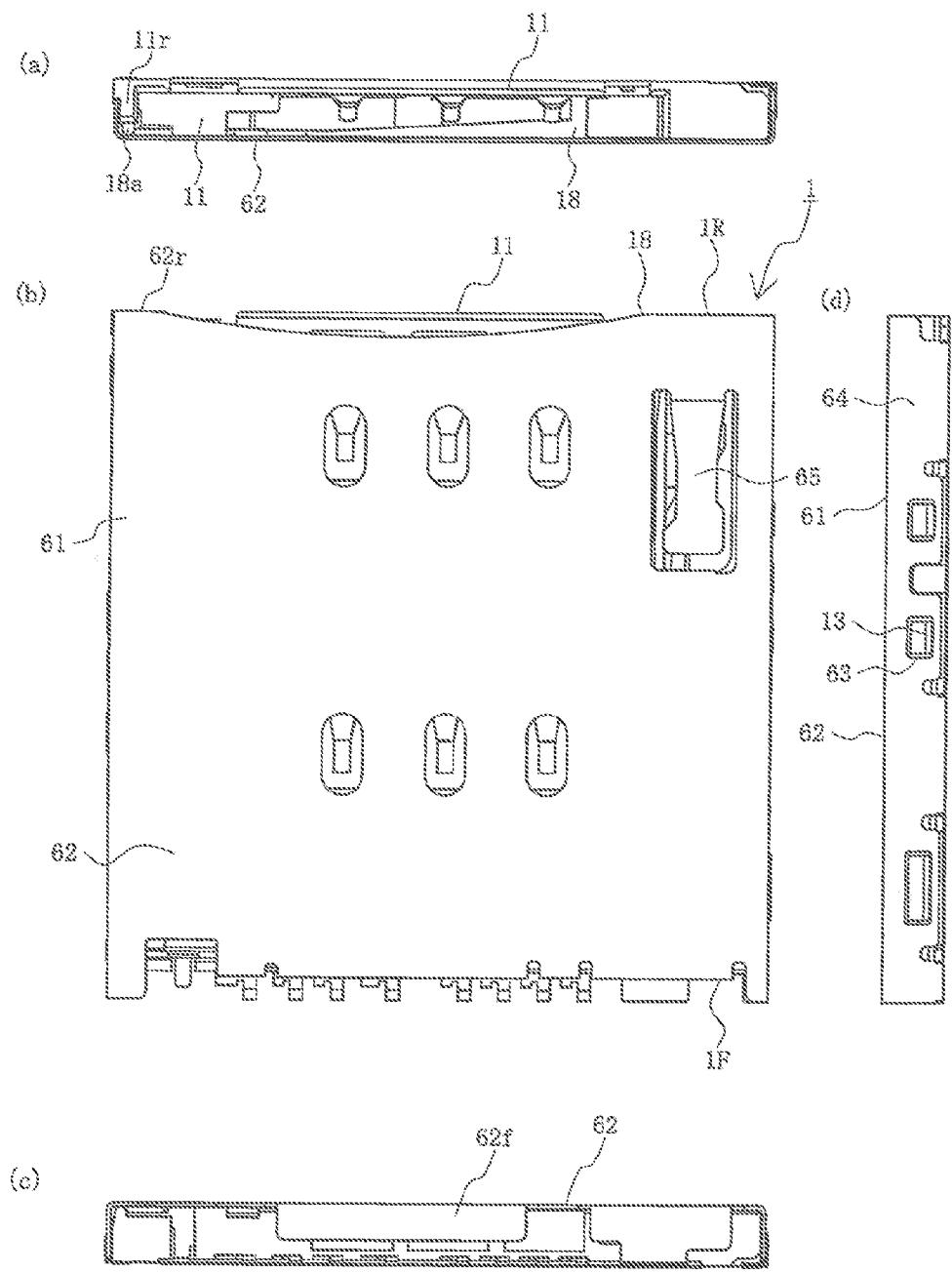

In the present embodiment, the card connector 1 has a housing 11 integrally molded from an insulating material, and a shell 61 serving as a cover member integrally formed by punching or bending a metal plate, and mounted on the upper side of the housing 11. The shell 61 covers the housing 11 and at least a portion of the upper face of the card tray 161 inserted into the housing 11. The card connector 1 has a substantially flat rectangular shape, and is mounted in an electronic device. The card tray 161 is inserted into the housing 11 from the insertion opening 18 in the rear (upward in FIG. 6(*b*)). More specifically, the card tray 161 is inserted into a space formed between the housing 11 and the shell 61. Also, the end portion at the front in the insertion direction of the card tray 161 into the card connector 1 (downward in FIG. 6(*b*)) is the front end 1F, and that at the rear in the insertion direction (upward in FIG. 6(*b*)) is the rear end 1R.

As shown, the housing 11 has a bottom wall portion 11*b*, which is a substantially rectangular panel-shaped member, and an inner wall portion 11*a* which runs along the end portion at the front in the insertion direction of the card tray 161 in the housing 11, that is, the front end portion 11*f*, and extends upward from the bottom wall portion 11*b*. The end portion at the rear in the insertion direction of the card tray 161 in the housing 11 is the rear end portion 11*r*.

Here, the bottom wall portion 11*b* has terminal holding recessed portions 11*c* holding the terminals 51 serving as the connecting terminals. The terminal holding recessed portions 11*c* are openings passing through the bottom wall portion 11*b* in the thickness direction, and form rows extending in the width direction of the housing 11. In the example shown, there are two rows of three recessed portions. In other words, the terminal holding recessed portions 11*c* and each one of the terminals 51 held by a terminal holding recessed portion 11*c* are arranged in two rows extending in the width direction of the housing 11.

At least a portion of the base portion 51*a* of each terminal 51 is embedded in the bottom wall portion 11*b*, and the rest is exposed inside the terminal holding recessed portions 11*b*. More specifically, the terminals 51 are "over molded;" that is, the terminals 51 are set inside the metal cavity of the housing 11 which is then filled with an insulating material so that at least a portion of the base portion 51*a* is covered by the insulating material constituting the bottom wall portion 11*b*, thereby embedding and holding the terminals in the bottom wall portion 11*b*.

Figure 7:
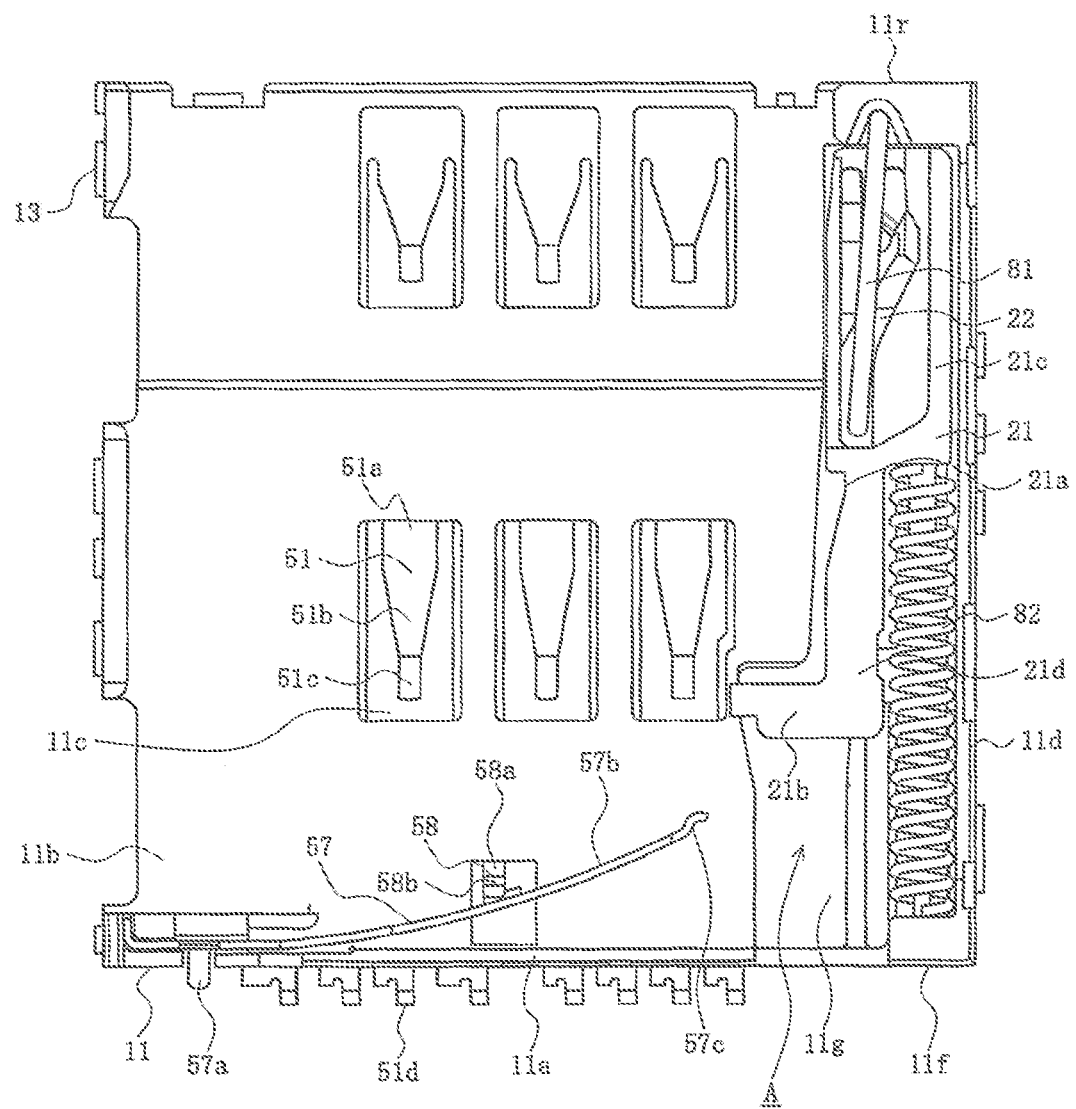
FIG. 7 shows a planar view showing the card connector of FIG. 5 with the shell removed.

Each terminal 51 has a cantilevered contact arm portion 51*b* connected to the base end of the base portion 51*a* and a contact portion 51*c* connected to the tip or free end of the contact arm portion 51*b*. The contact arm portion 51*b* has a base end positioned on the rear terminal portion 11*r*, and a tip extending at an angle upward towards the front end portion 11*f*. At least the upper face of the contact portion 51*c* is positioned above the bottom wall portion 11*b* when a card 102 accommodated in a card tray 161 has not been inserted into the card insertion space. The contact portion 51c has a side surface shape, curved so as to extend upward, and the tip faces down at an angle. As shown in FIG. 7, the contact arm portion 51b and the contact portion 51c are positioned inside the terminal holding recessed portion 11c when viewed from above. The terminals 51 are arranged so that the contact portions 51c contact the contact pads 151 on the card 102 inside the card tray 161 held inside the card connector 1. Thus, the number and arrangement of terminals 51 depends on the number and arrangement of contact pads 151 on the card 102.

One end of a slender band-shaped connector (not shown) is connected to the base portion 51a of the terminal 51. This connector extends in the longitudinal direction of the housing 11, and is embedded in the bottom wall portion 11b. A solder tail portion 51d extends forward from the other end of the connector, and protrudes from the front end portion 11f where it is exposed in the front. The solder tail portion 51d is electrically connected using solder to an opposing terminal member formed in a printed circuit board of the electronic device.

Figure 8:
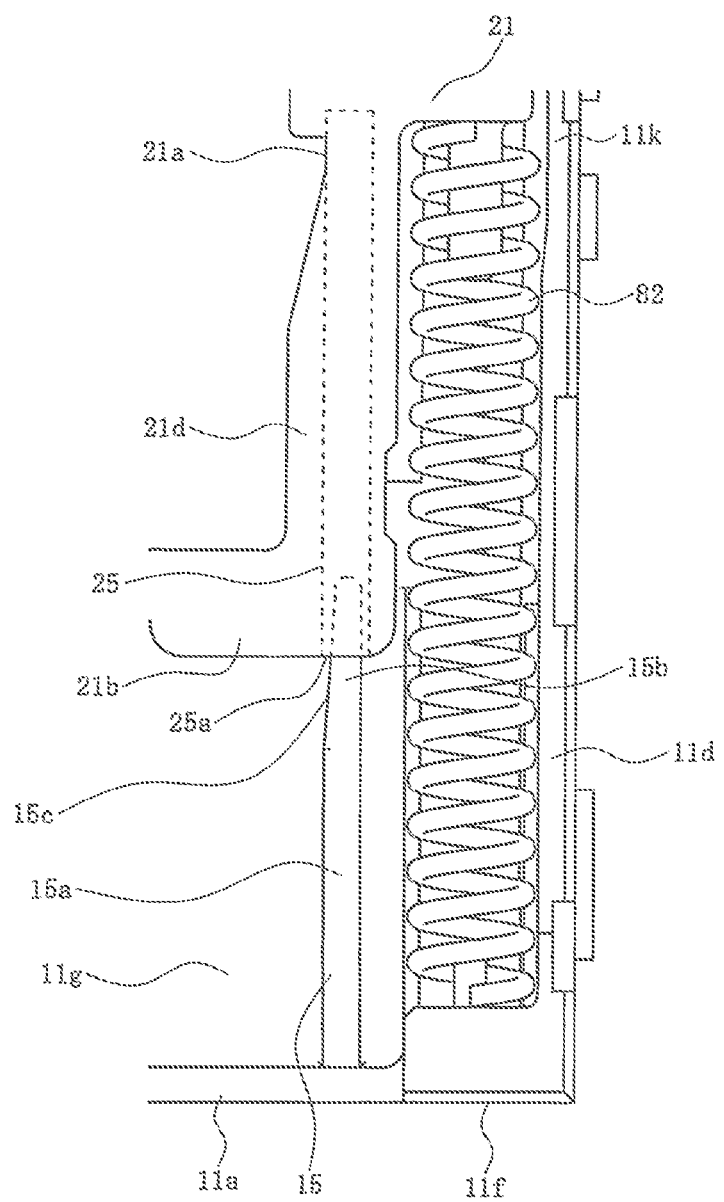
FIG. 8 shows an expanded view of Section A of the card connector of FIG. 7.

The housing 11 has a pair of side wall portions 11d extending longitudinally along the side edge, and a tray guiding mechanism accommodating portion 11g is formed inside one of the side wall portions 11d. A sliding member 21 of the tray guiding mechanism used to guide the card tray 161 inserted into the card connector 1 is slidably mounted in the tray guiding mechanism accommodating portion 11g so as to be able to slide longitudinally. In this way, the sliding member 21 can slide longitudinally along one of the side wall portions 11d. More specifically, as shown in FIG. 8, a guide rail 15 or slender ridge is formed in the upper face of the bottom wall portion 11b in the tray guiding mechanism accommodating portion 11g and extends in the longitudinal direction. A guide groove 25 or slender recessed groove is formed in the bottom faces of the extended portion 21d extending from the main portion 21c of the sliding member 21 towards the front end portion 11f, and the groove extends in the longitudinal direction. The guide groove 25 slidably engages the guide rail 15. Here, 25a is the insertion opening in the guide groove 25. In this way, the sliding member 21 can slide along the guide rail 15 in the longitudinal direction.

The guide rail 15 has a wide portion 15a near the front end portion 11f, and a pointed tip portion 15b serving as a narrow portion with a width dimension smaller than the wide portion 15a which extends from the rear end of the wide portion 15a towards the rear end portion 11r. The pointed tip portion 15b becomes narrower as the rear end portion 11r is approached. More specifically, the face of the pointed tip portion 15b in the middle of the housing 11 in the width direction, when viewed from above, is an inclined face 15c which inclines outward in the width direction of the housing as the rear end portion 11r is approached, and the side face on the opposite side; that is, the side face on the outside of the housing 11 in the width direction is flush with the side face of the wide portion 15a and extends longitudinally. The width dimension of the wide portion 15a is nearly the same as the width dimension of the guide groove 25, and the width dimension of the pointed tip portion 15b abates as the rear end portion 11r is approached.

Therefore, as shown in FIGS. 7-8, when the sliding member 21 is positioned near the rear end portion 11r, the sliding member 21 can be displaced in the direction away from the center of the housing in the width direction (to the right in FIGS. 7-8); that is, towards the outside in the width direction of the housing 11. Thus, the portion of the side wall portion 11d near the rear end portion 11r is a thin portion 11k with a smaller width diameter than the other portion, and does not interfere with the main portion 21c of the sliding member 21 even when the sliding member 21 is displaced outward in the width direction of the housing 11. Also, a cam groove 22 serving as a heart-shaped cam is formed on the upper face of the sliding member 21, and the free end of a slender pin member 81 serving as a fixed cam member engages the cam groove 22. The other end of the pin member 81 is fixed pivotally to the upper face of the rear end portion 11r of the housing 11 as the fixed end. The pin member 81 and the cam groove 22 work together to perform a push/push operation on the sliding member 21 moving along with the card tray 161.

A biasing member 82 or coil spring is accommodated inside the tray guiding mechanism accommodating portion 11g to provide biasing force in a compressed state which biases the sliding member 21 towards the rear end portion 11r; that is, in the ejection direction of the card tray 161 which is the direction opposite that of the insertion direction. The sliding member 21 has an engaging recessed portion 21a and engaging hook portion 21b serving as a tray holding portion which engages and holds the card tray 161. The engaging recessed portion 21a is formed in a side face of the sliding member 21; that is, recessed in the side face of the connection between the main portion 21c and the extended portion 21d, and engages the engaging protruding portion 172a protruding from the side panel of the card tray 161. Also, the engaging hook portion 21b formed in the front end of the extended portion 21d engages the corner where the front panel portion 165 joins the side panel portion 164 in the card tray 161. The sliding member 21 holds the card tray 161 using the engaging recessed portion 21a and the engaging hook portion 21b, and moves longitudinally along with the card tray 161.

A card connector 1 with this tray guiding mechanism has to operate to push in a card tray 161 when a card tray 161 is inserted into the card connector 1 and when the card tray 161 is ejected from the card connector 1. In other words, it requires a push-in/push-out or push/push operation. This operation is similar to the alternating operation of a push button (position-holding button or push-in/push-out button). The pin member 81 and the cam groove 22 work together to perform the push/push operation on the sliding member 21 moving with the card tray 121. In this way, the tray guiding mechanism is able to push the card tray 161 until the card tray 161 has been moved in the insertion direction. When it reaches the end point, the biasing force of the biasing member 82 moves the card tray 161 from the end point in the ejection direction, which is the direction opposite that of the insertion direction. At the locking position, the sliding member 21 stops. In this way, the card tray 161 is held inside the card connector 1.

The pin member 81 is biased downward by the pin pressing member 65 of the shell 61 and held. The pin pressing member 65 is an elastic plate-like member formed by compressibly bending a portion of the shell 61 in the direction of the bottom wall portion 11b of the housing 11, and the pin member 81 is positioned between the pin pressing member 65 and the sliding member 21 or housing 11, and held so as not to be released by the sliding member 21 or housing 11.

The shell 61 has a substantially rectangular top panel portion 62 and a side panel member 64 protruding from the side edge of the top panel portion 62. A plurality of locking openings 63 are formed in the side panel portion 64. When the shell 61 is mounted on the upper side of the housing 11, the locking openings 63 are locked in the locking protrusions 13 formed in the outer side surface of the side wall portion 11d of the housing 11. In this way, the shell 61 is secured in the housing 11. The front and rear end portions at the top panel portion 62 in the insertion direction are the shell front end portion 62f and shell rear end portion 62r.

A card detecting switch is provided near the front end portion 11f of the housing 11 to detect contact between the contact pads 151 of the card 102 and the terminals 51 and thus insertion of the card 102 into the card connector 1. The card detecting switch is formed by the front end portion 11f, a cantilevered first contact member 57 mounted nearby, and a second contact member 58 embedded mostly in the bottom wall portion 11b.

The first contact member 57 has a mounting portion 57a mounted in the front end portion 11f, a cantilevered main portion 57b whose base end is connected to the mounting portion 57a and extends in the lateral direction, and an abutting portion 57c connected to the free end of the main portion 57b. The mounting portion 57a is substantially parallel to the side face of the inner wall portion 11a, the main portion 57b is inclined towards the side face of the inner wall portion 11a when a card 102 is not inserted into the card connector 1, and the abutting portion 57c is arranged so as to protrude towards the rear end portion 11r, that is, towards the rear. Thus, when a card 102 is inserted, the front end 111f of the card 102 abuts the abutting portion 57c. The second contact member 58 has a plate-shaped mounting portion 58a embedded in the bottom wall portion 11b, and a contact portion 58b whose base end is connected to the mounting portion 58a and whose tip is exposed from the bottom wall portion 11b.

When a card 102 is not inserted, as shown in FIG. 7, the main portion 57b of the first contact member 57 comes into contact with the contact portion 58b of the second contact member 58. As a result, the first contact member 57 comes into contact with the second contact member 58, and the card detecting switch is activated or turned on. However, when a card 102 is inserted and the contact pads 151 and terminals 51 come into contact, the abutting portion 57c of the first contact member 57 is displaced and pushed towards the front end portion 11f by the front end 111f of the card 102, and the main portion 57b of the first contact member 57 is separated from the contact portion 58b of the second contact member 58. In this way, the first contact member 57 and the second contact member 58 do not come into contact, and the card detecting switch is deactivated or turned OFF. In this way, the card 102 reaching the point where the contact pads 151 and terminals 51 come into contact is detected.

In the present embodiment, a notch portion 165a is formed in the front panel portion 165 of the card tray 161 so that at least a portion of the front end 111f of the card 102 is exposed from the front end 161F of the card tray 161 when a card 102 inside a card tray 161 has been inserted into the card connector 1. The notch portion 165a is formed with at least a portion corresponding to the abutting portion 57c of the first contact member 57. In this way, the front end 111f of the card 102 makes direct contact with the abutting portion 57c and does not contact the main panel portion 165 of the card tray 161 even when the card 102 is inserted while accommodated in a card tray 161. Therefore, the card detecting switch can properly detect when the card 102 has reached a predetermined position where the contact pads 151 and the terminals 51 contact.

A notch portion 165a is formed in the portion corresponding to the abutting portion 57c of the first contact member 57 in the front panel portion 165 of the card tray 161, and the abutting portion 57c does not come into contact with any portion of the card tray 161 because of the absence of the front panel portion 165 when a card tray 161 that does not contain a card 102 is inserted. Therefore, the card detecting switch does not detect any card 102 at the predetermined position. In other words, when a card tray 161 that does not contain a card 102 is inserted, it does not mistakenly detect the insertion of a card 102.

When a card tray 161 not containing a card 102 is inserted, the card detecting switch does not detect the presence of a card 102. Therefore, when the card tray 161 and card connector 1 are not being used, the empty card tray 161 can be stored inside the card connector 1. As a result, the empty card tray 161 is not misplaced.

Figure 5:
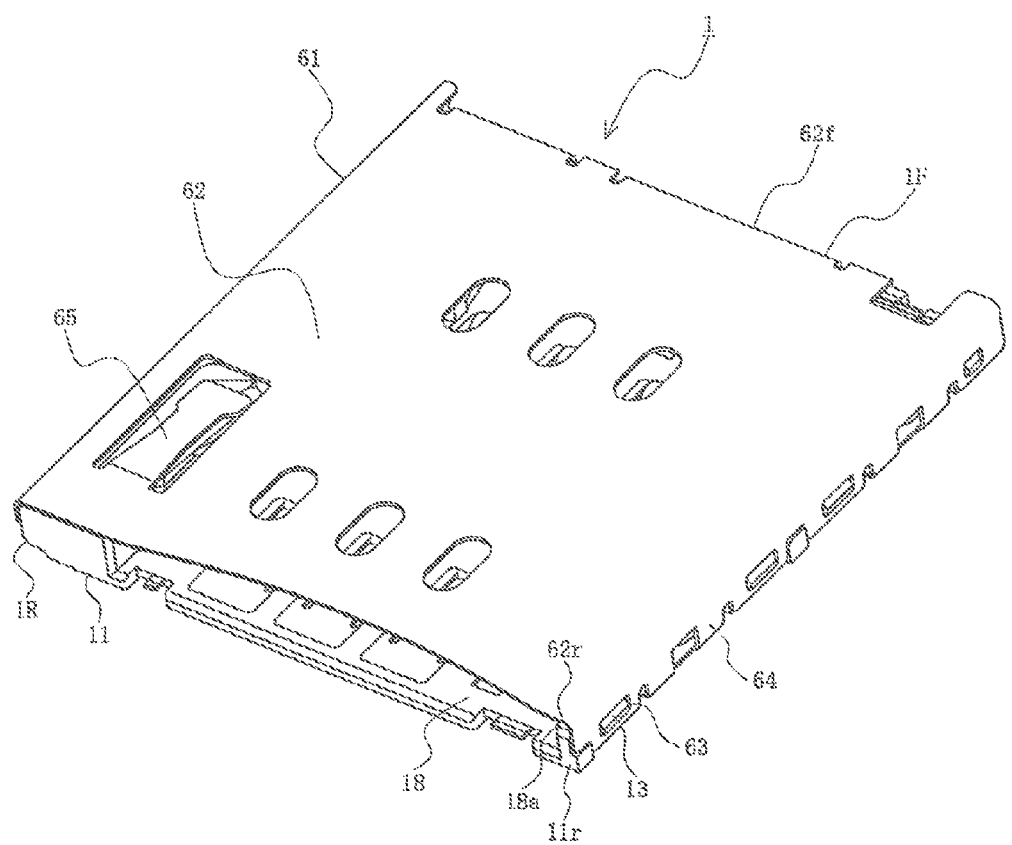
FIG. 5 shows a perspective view of a card connector according to an embodiment of the Present Disclosure.

As shown in FIGS. 5 and 6(a), an insertion allowing slit 18a serving as a mistaken insertion preventing portion is formed in one end of the insertion opening 18. More specifically, the insertion allowing slit 18a is a slit-like gap between the shell rear end portion 62r and the upper face of the rear end portion 11r of the housing 11 on the side opposite the tray guiding mechanism accommodating portion 11g. This slit-like gap extends in the width direction of the card connector 1. When a card tray 161 is properly inserted into the insertion opening 18, the protruding piece 173 of the card tray 161 can pass through the slit-like opening formed at this position. In other words, the protruding piece 173 is allowed to pass when the card tray 161 is inserted properly. Thus, when a card tray 161 has been inserted improperly, the protruding piece 173 comes into contact with the rear end portion 11r on the opposite side from the insertion allowing slit 18a, and the card tray 161 cannot be inserted into the insertion opening 18. Also, when the card tray 161 is inserted improperly, the card tray 161 cannot be inserted into the insertion opening 18 because the height dimension of the panel end portions 163a on both the left and right rear panel portions 163 is greater than the thickness dimension of the insertion opening 18. At this time, the shell rear end portion 62r and the rear end portion 11r of the housing 11 function as mistaken insertion preventing portions for the card connector 1.

Figure 9:
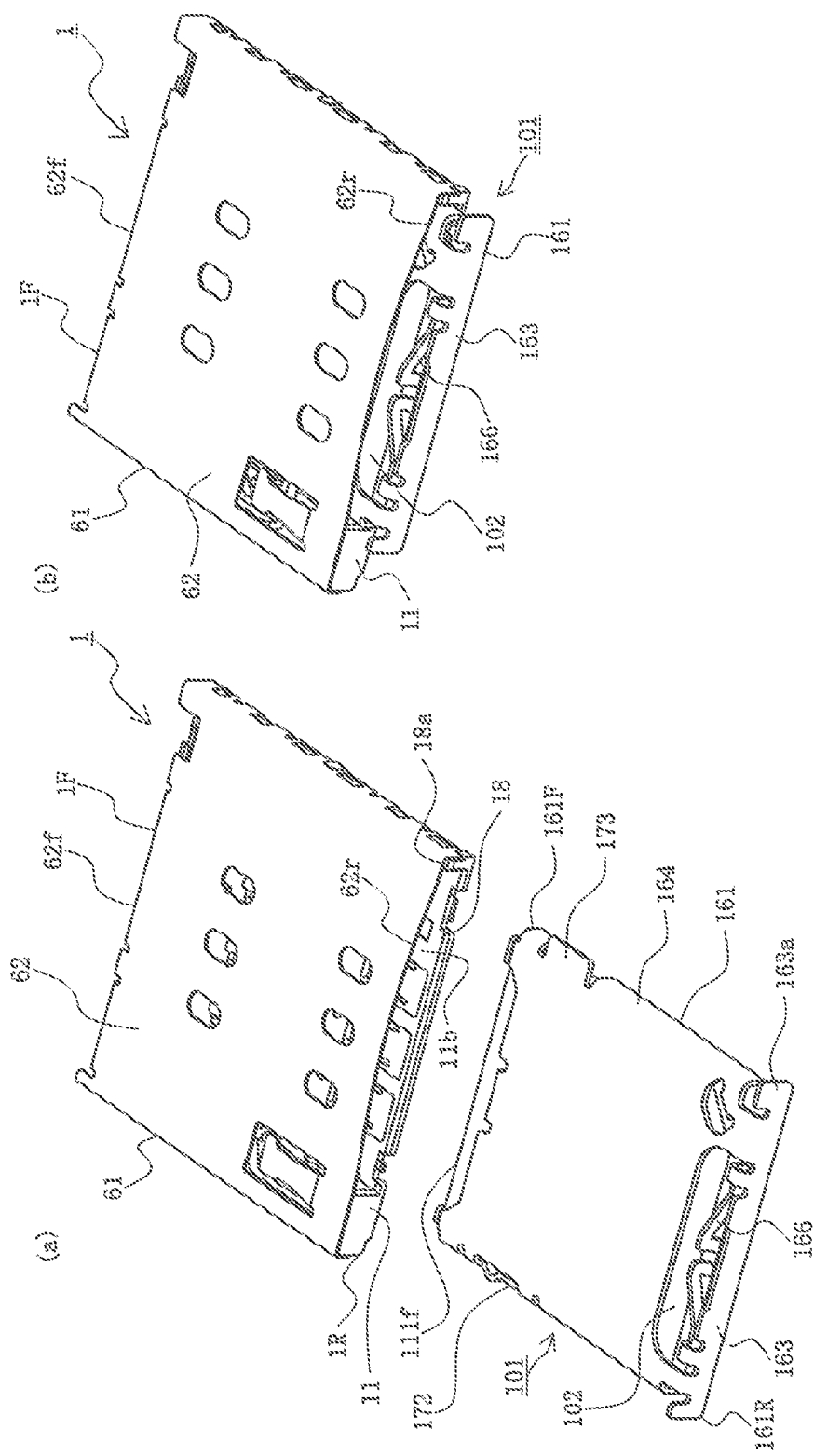

In operation, the user, as shown in FIG. 9(a), inserts the card tray 161 containing a card 102 from the insertion opening 18 to the rear of the card connector 1 into the card insertion space formed between the housing 11 and the shell 61. The card tray 161 is aligned upward with the top panel portion 162; that is, the top panel portion 62 of the shell 61, and the front end 161F is aligned with the front end 1F of the card connector 1. In other words, it is inserted properly. Also, the protruding piece 173 on the card tray 161 is aligned with the insertion allowing slit 18a formed on one end of the insertion opening 18 in the card connector 1. Here, the card 102 accommodated inside the card tray 161 is aligned so that the open bottom face 111a including the contact pads 151 is facing downward towards the bottom wall portion 11b of the housing 11 including the terminal 51, and so that the front end 111f faces the front end 1F. When the card tray 161 is inserted from the insertion opening 18 into the card insertion space formed between the housing 11 and the shell 61, the protruding piece 173 passes through the insertion allowing slit 18a, and the side panel portion 164 on which the engaging portion 172 is not formed passes through the card insertion space along the side wall portion 11d of the housing 11 on which the tray guiding mechanism accommodating portion 11g has not been formed.

Figure 10:
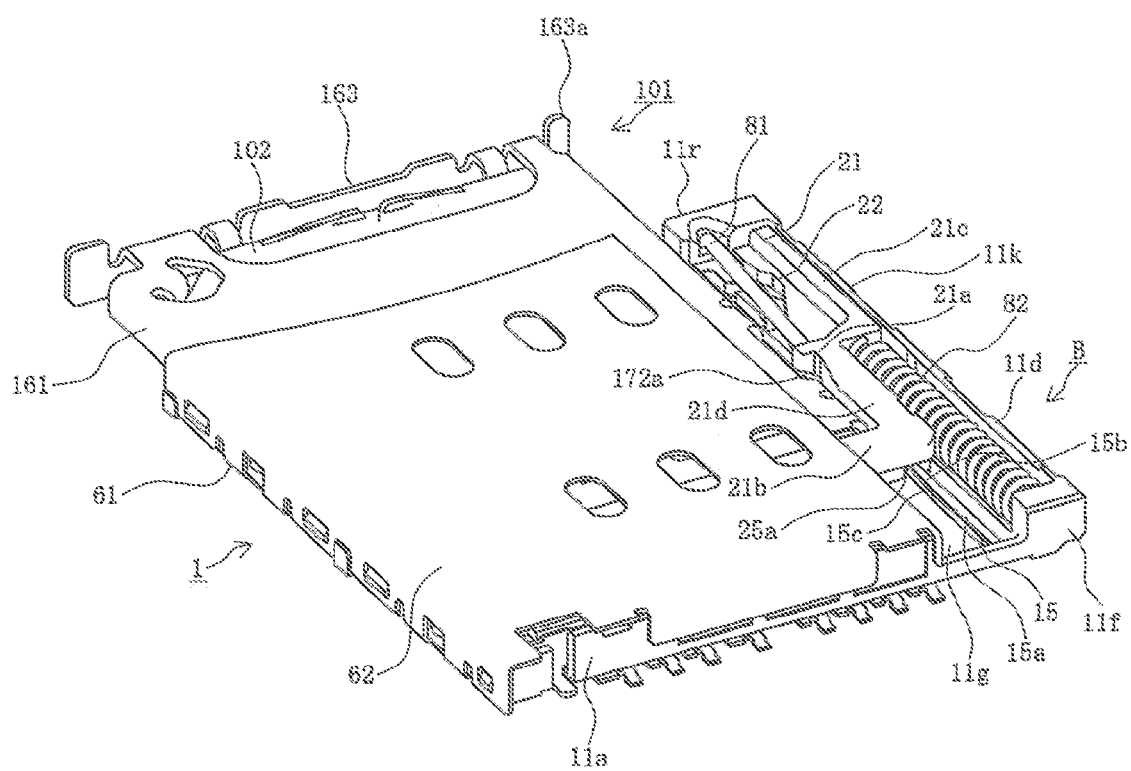
FIG. 10 shows a first perspective view with the shell removed showing the operation when a card-type unit is inserted into the card connector of FIG. 10.
Figure 12:
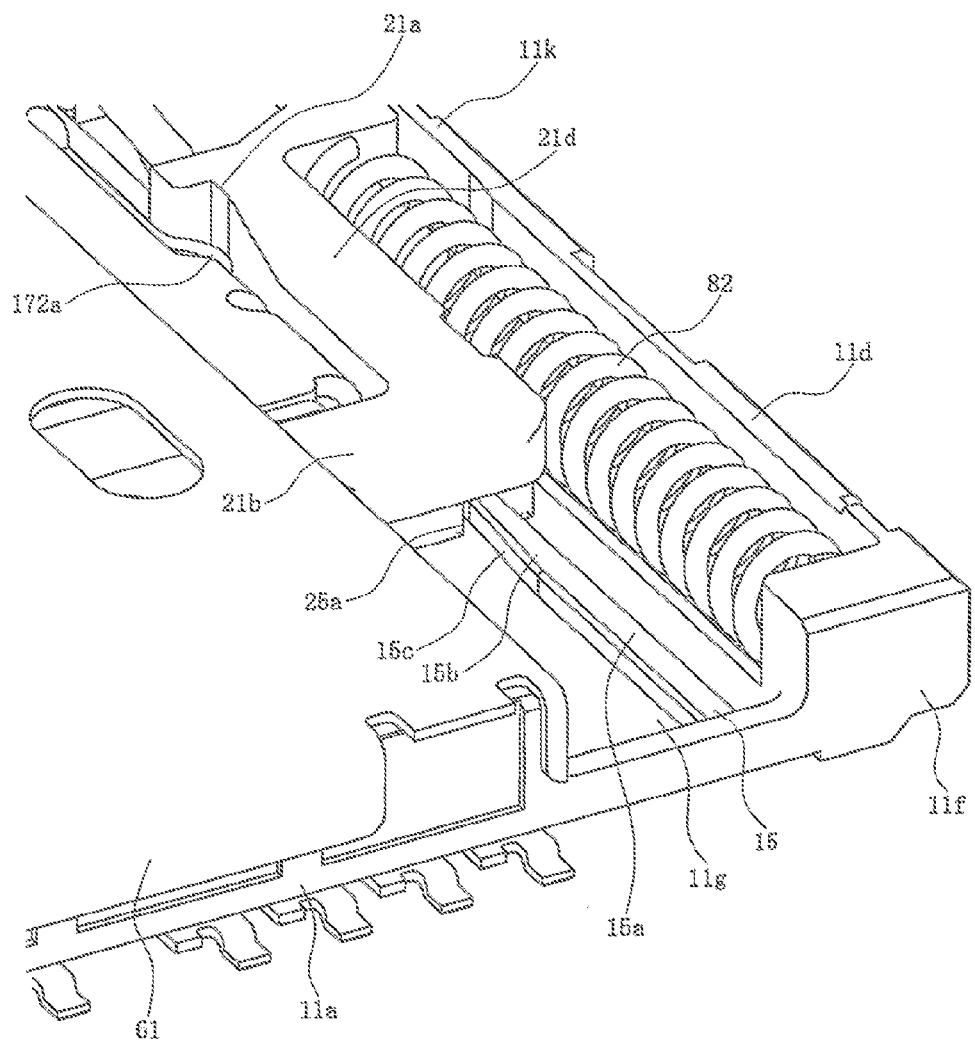
FIG. 12 shows a first enlarged view showing the operation in Section B of FIG. 10 when a card-type unit is inserted into the card connector of FIG. 10.
Figure 14:
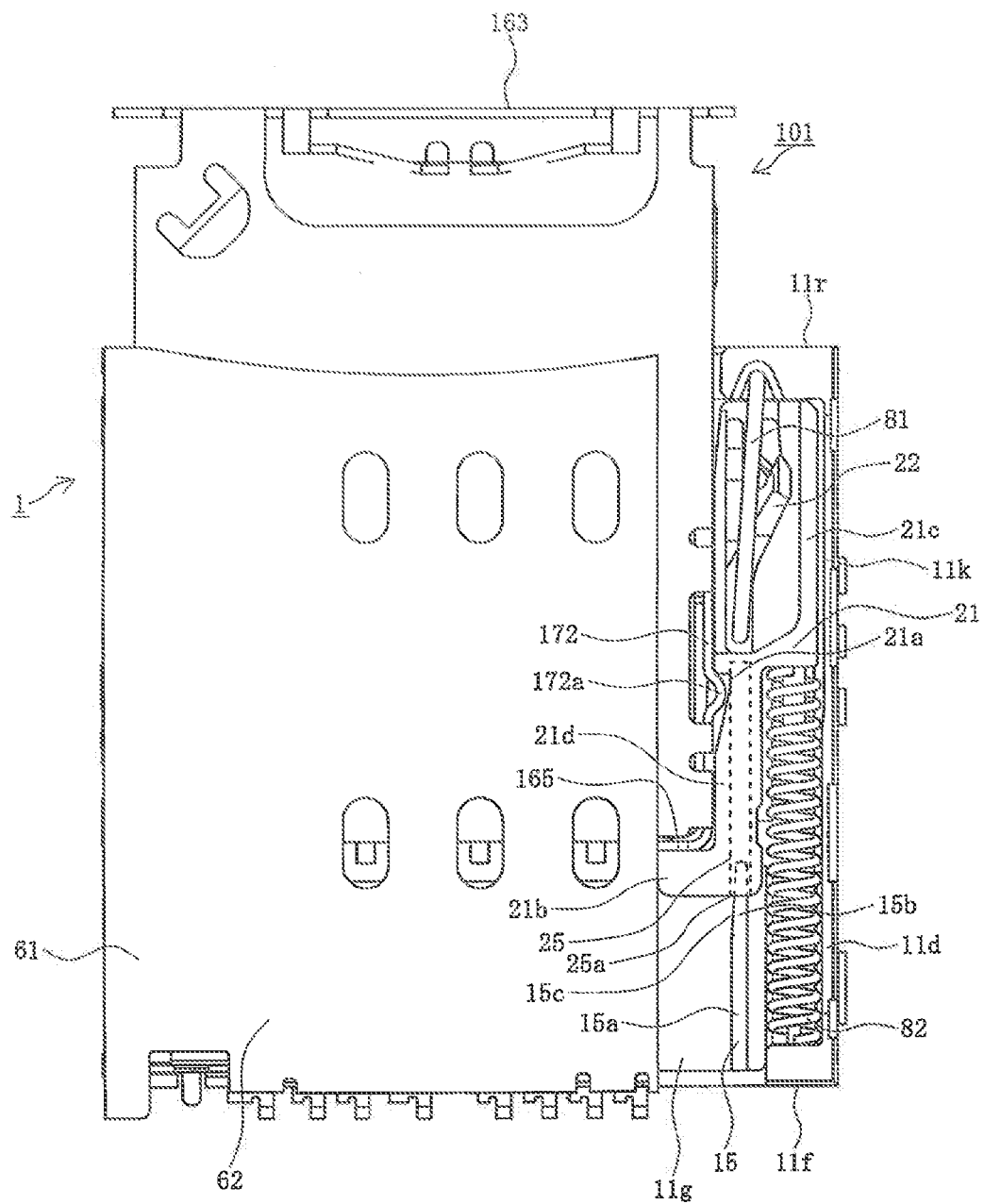
FIG. 14 shows a planar view with a portion of the shell removed showing the operation when a card tray is inserted into the card connector of FIG. 10.
Figure 15:
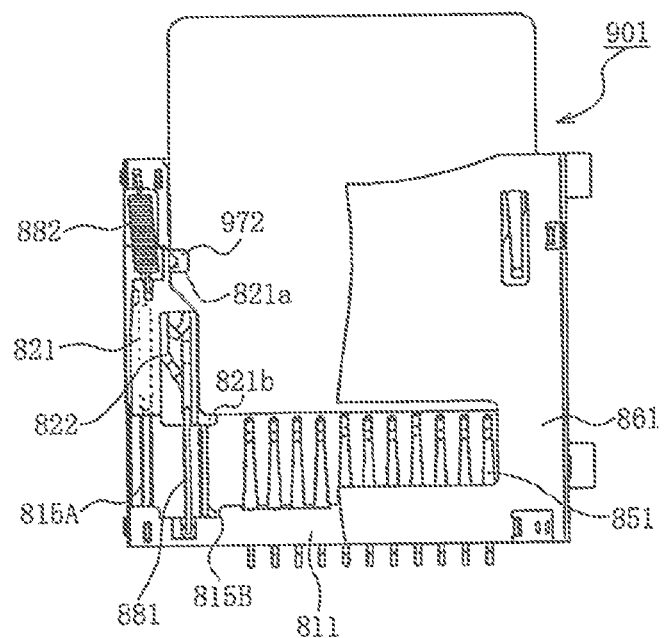
FIG. 15 shows a planar view of a conventional connector.

Next, when the user pushes the card tray 161 further in, as shown in FIGS. 10, 12 and 14, the engaging recessed portion 21a and the engaging hook portion 21b of the sliding member 21 engage the engaging protrusion portion 172a formed in the engaging portion 172 of the card tray 161 and the corner where the front panel portion 165 and the side panel portion 164 of the card tray 161 meet. In this state, the sliding member 21 abuts the rear end portion 11r of the housing 11 due to the biasing force of the biasing member 82. In other words, the sliding member 21 is in the furthest back position or the ejection position.

Also, the insertion opening 25a of the guiding groove 25 in the sliding member 21 is positioned at the pointed tip portion 15b of the guide rail 15. In other words, as shown in FIG. 12, because the guide groove 25 is engaged in the pointed tip portion 15b which is narrower than the guide groove 25, the sliding member 21 can be displaced towards the outside of the housing 11 in the width direction, that is, in the direction approaching the side wall portion 11d (to the right in FIG. 14). As shown in FIG. 14, when the sliding member 21 is at the ejection position, the side wall portion 11d does not interfere even when the sliding member 21 approaches the side wall portion 11b because the side wall portion 11d corresponding to the position of the main portion 21c is the thin portion 11k.

Therefore, when the engaging recessed portion 21a of the sliding member 21 engages the engaging protruding portion 172a formed in the engaging portion 172 of the card tray 161, the engaging recessed portion 21a and the engaged protruding portion 172a can smoothly engage each other, because the sliding member 21 can be deformed in a direction away from the engaging portion 172 of the card tray 161. Also, because the engaging portion 172 is elastically deformable, it can be displaced away from the sliding member 21. This also enables the engaging recessed portion 21a and the engaging protruding portion 172a to engage each other smoothly. As the engaging recessed portion 21a and the engaging hook portion 21b of the sliding member 21 engage the engaging protrusion 172a formed in the engaging protrusion 172 of the card tray 161 and the corner where the front panel portion 165 and the side panel portion 164 of the card tray 161 meet to hold the card tray 161, the card tray 161 containing the card 102 moves towards the front end 1F of the card connector 1, along with the sliding member 21.

At this time, the force applied by the user is transmitted from the card tray 161 to the sliding member 21. Because the sliding member 21 compresses the biasing member 82, which is a coil spring, the sliding member 21 and the card tray 161 are subjected to the rebounding force of the biasing member 82. However, because the rebounding force is smaller than the force applied by the user, the rebounding force is resisted. Because the guide groove 25 slidably engages the guide rail 15, the sliding member 21 slides along the guide rail 15, and the card tray 161 advances along with the sliding member 21. The sliding member 21 and the card tray 161 reach the overstroke position, which is the farthest forward position, and enter an overstroke state.

The height dimension of the side panel portion 164 and front panel portion 165 of the card tray 161 is smaller than the thickness dimension of the card 102. When the card tray 161 has advanced into the card insertion space in this manner, the bottom end of the side panel portion 164 and the front panel portion 165 are above the bottom face 111a of the card 102; that is, near to the top panel portion 62 of the shell 61. As a result, the bottom end of the side panel portion 164 and front panel portion 165 do not abut the bottom wall portion 11b of the housing 11. As a result, the components on the bottom wall portion 11b such as the terminals 51 are not damaged.

Figure 11:
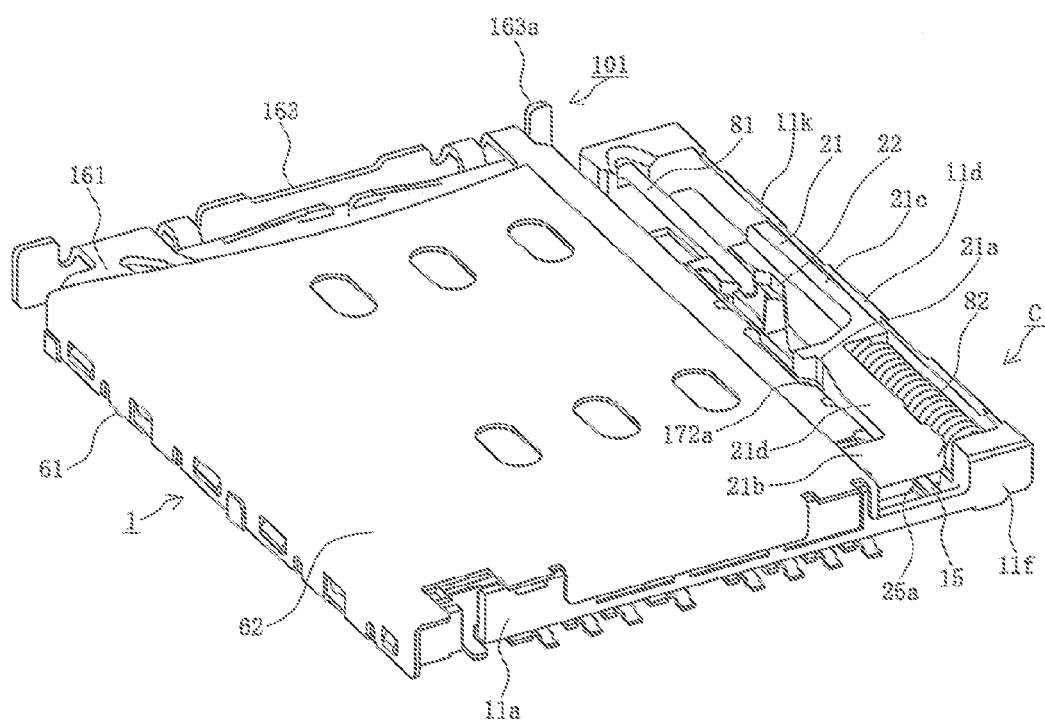
FIG. 11 shows a second perspective view with the shell removed showing the operation when a card-type unit is inserted into the card connector of FIG. 10.
Figure 13:
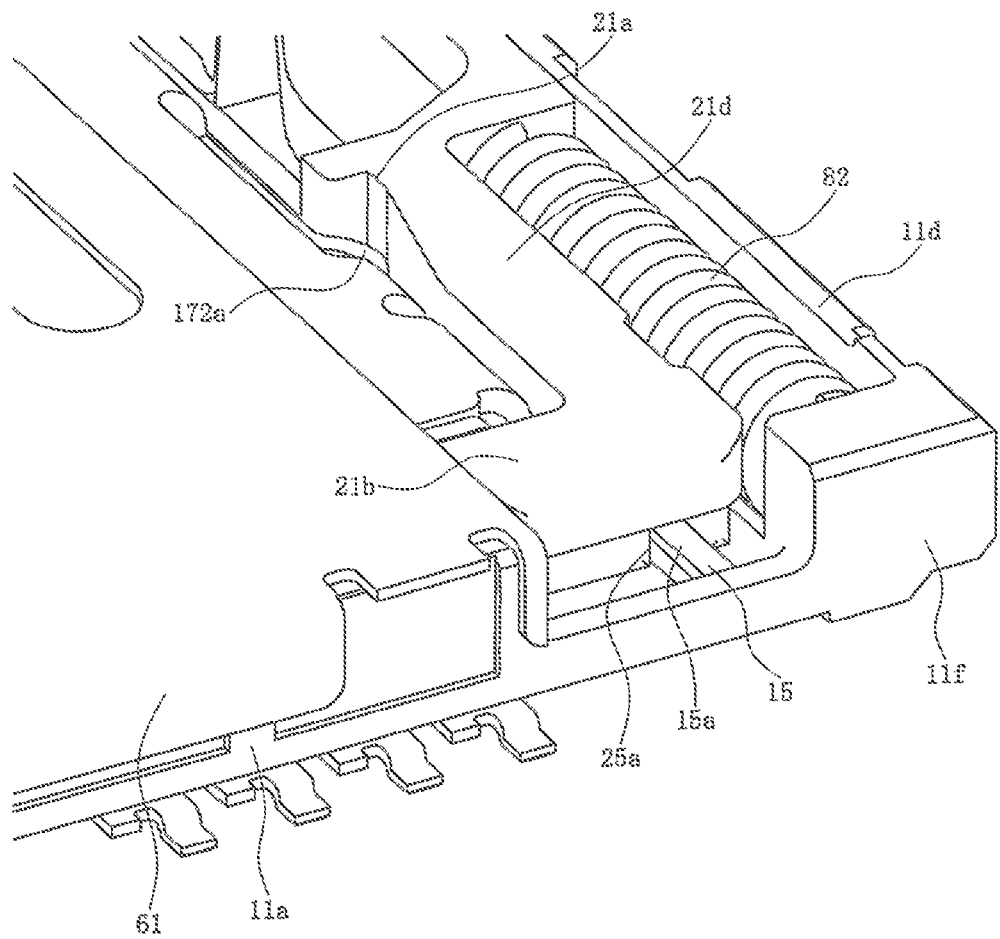
FIG. 13 shows a first enlarged view showing the operation in Section C of FIG. 11 when a card-type unit is inserted into the card connector of FIG. 10.

When the user stops pushing the card tray 161 and releases the pressure on the card tray 161, the rebounding force of the biasing member 82 moves the sliding member 21 and the card tray 161 to the rear away from the front end 1F of the card connector 1. As shown in FIGS. 9(b), 11 and 13, the sliding member 21 and the card tray 161 stop at the locking position where the card tray 161 is held inside the card connector 1 in a locked state. The free end of the pin member 81 engaging the cam groove 22 formed in the upper face of the sliding member 21 is locked in a portion of the cam groove 22 and stops the movement of the sliding member 21, thereby stopping the sliding member 21 in the locked position.

Also, the insertion opening 25a of the guiding groove 25 in the sliding member 21 is positioned in the wide portion 15a of the guide rail 15. In other words, as shown in FIG. 13, because the guide groove 25 engages the wide portion 15a, which has nearly the same width dimension as the guide groove 25, the sliding member 21 cannot be displaced outward in the width direction of the housing 11; that is, in the direction approaching the side wall portion 11d. In other words, the sliding member 21 is not shaky in the lateral direction. Also, as shown in FIG. 8 and FIG. 14, the length of the wide portion 15a of the present embodiment in the longitudinal direction is at least half the overall length of the guide rail 15 in the longitudinal direction. As a result, when the sliding member 21 is in the locked position, the guide groove 25 engages the width portion 15a within a wide range in the longitudinal direction. The effectively prevents shaky movement of the sliding member 21 in the lateral direction. Because the position and orientation of the sliding member 21 is stable and not shaky in the locked position, the engaging recessed portion 21a and the engaging protruding portion 172a do not become disengaged. Therefore, the card tray 161 does not come off the sliding member 21.

The card 102 accommodated inside the card tray 161 held along with the card tray 161 in the locked position, can then exchange data with the computing means inside the electronic device encompassing the card connector 1. When the card 102 is held in the locked position, the contact portions 51c of the terminals 51 on the card connector 1 establish contact with the contact pads 151 on the card 102. The abutting portion 57c of the first contact member 57 of the card detecting switch is pushed forward and displaced by the front end 111f of the card 102, and the main portion 57b is separated from the contact portion 58b of the second contact member 58. When the first contact member 57 and the second contact member 58 are no longer in contact, the card detecting switch is turned off, and the card 102 is determined to be in the predetermined position inside the card connector 1; that is, in the position where the contact pads 151 and terminals 51 are in contact with each other.

Because the card 102 accommodated inside the card tray 161 is biased by the spring action of the elastic arm portion 166, the front end 111f applies pressure to the front panel portion 165. Thus, the position of the front panel portion 165 of the card tray 161 is used as a reference position for the proper positioning of the front end 111f of the card 102. Because the card detecting switch performs the detecting operation when the abutting portion 57c of the first contact member 57 contacts the front end 111f of a properly positioned card 102, the card detecting switch performs the detection operation properly, and the card 102 is properly detected at the position where the contact pads 151 and the terminals 51 contact each other.

When a card connector other than card connector 1 is mounted in an electronic device, the user may not use card connector 1. At this time, a card tray 161 not containing a card 102; that is, an empty card tray 161, may be inserted into the card connector 1 for storage. When a card tray 161 not containing a card 102 is inserted, a notch portion 165a is formed in the portion of the front panel portion 165 of the card tray 161 corresponding to the abutting portion 57c of the first contact member 57. Because there is no front panel portion 165, the abutting portion 57c does not come into contact with any portion of the card tray 161. As a result, the card detecting switch does not detect a card 102 reaching the predetermined position. In other words, when a card tray 161 not containing a card 102 is inserted, the insertion of a card 102 is not mistakenly detected. Because the notch portion 165*a* is preferably formed in a portion corresponding to the region including the terminals 51 where the front panel portion 165 does not exist, the front panel portion 165 does not come into contact with terminals 51 and damage the terminals 51 when a card tray 161 not including a card 102 is inserted into the card connector 1.

To eject, when the user pushes in the card tray 161, the sliding member 21 and the card tray 161 are moved from the locked position towards the front end 1F. When the user pushes in the card tray 161 further, the sliding member 21 and the card tray 161 reach the overstroke position, the farthest forward position, and enter an overstroke state. When the user stops pushing and releases the pressure on the card 102, the biasing force of the biasing member 82 moves the sliding member 21 and the card tray 161 to the rear away from the front end 1F in the direction opposite the insertion direction. The sliding member 21 and the card tray 161 move to the rear beyond the locking position, and stop at the ejection position, shown in FIGS. 10, 12 and 14.

As shown in FIGS. 10, 12 and 14, the sliding member 21 remains engaged with the card tray 161 at the ejection position. Therefore, card tray 161 does not come off the sliding member 21 even when there is an impact as the sliding member 21 reaches the ejection position, abuts the rear end portion 11*r* of the housing 11, and comes to a stop. In this way, the card tray 161 and card 102 contained inside the tray are kept from coming out of the card connector 1 and becoming lost. As mentioned above, the sliding member 21 can be displaced away from the engaging portion 172 of the card tray 161 in the ejection position, the engaging recessed portion 21*a* and the engaging protruding portion 172*a* can be smoothly disengaged by pulling out the card tray 161 using a finger. Because the engaging portion 172 is elastically deformable, it can be displaced in a direction away from the sliding member 21. This enables the engaging recessed portion 21*a* and the engaging protruding portion 172*a* to be smoothly disengaged. Thus, the user can easily remove the card tray 161 from the card connector 1 at the ejection position.

When the user is not aware of the push/push operation, the user may attempt to forcibly pull out the card tray 161 at the locked position instead of pushing in the tray. When forcible extraction occurs in the present embodiment, the elastically deformable engaging portion 172 can be displaced in a direction away from the sliding member 21. In this way, the engaging recessed portion 21*a* and the engaging protruding portion 172*a* are disengaged, and the card tray 161 pulled away from the sliding member 21. Thus, the card tray 161 and the sliding member 21 are not damaged when the user performs forcible extraction.

In the present embodiment, the card connector 1 include: a housing 11 accommodating a card-type unit 101 having contact pads 151 on one face; terminals 51 mounted on the housing 11 to make contact with the contact pads 151 on the card-type unit 101; a sliding member 21 for holding the inserted card-type unit 51 and sliding from the rear end portion 11*r* to the front end portion 11*f* of the housing 11; a biasing member 82 for biasing the sliding member 21 towards the rear end portion 11*r*; a card guiding mechanism for holding the card-type unit 101 at the locked position while maintaining contact between the terminals 51 and the contact pads 151 of the card-type unit 101, and for moving the sliding member 21 from the end point to the rear end portion 11*r* using the biasing force of the biasing means 82 so the card-type unit 101 reaches the ejection portion when the card-type unit 101 held in the locked position is pushed towards the front end portion 11*f* and reaches the end point at the front end portion 11*f*; and a shell 61 mounted on the housing 11 and covering the sliding member 21 and at least a portion of the card-type unit 101 inserted into the housing 11. The housing 11 has a guide rail 15 protruding from the upper face of the bottom wall portion 11*b* and extending towards the rear end portion 11*r*. The guide rail 15 includes a wide portion 15*a* near the front end portion 11*f*, and a pointed tip portion 15*b* near the rear end portion 11*r* which is narrower than the wide portion 15*a*. The sliding member 21 has a guide groove 25 slidably engaging the guide rail 14. The guide groove 25 engages the wide portion 15*a* when the card-type unit 101 is in the locked position, and the guide groove 25 engages the pointed tip portion 15*b* instead of the wide portion 15*a* when the card-type unit 101 is in the ejection position. In this way, the position and orientation of the sliding member 21 is stabilized in the locking position using a simple configuration, the card-type unit 101 can be securely held, and the card-type unit 101 does not come off the sliding member 21. Because the sliding member 21 is held in the card-type unit 101 at the ejection position, the card-type unit 101 is kept from falling out, and the user can easily pull out the card-type unit 101. The width dimension of the card connector 1 can also be reduced.

The card-type unit 101 also has an engaging protruding portion 172*a* protruding from a side face, the sliding member 21 has an engaging recessed portion 21*a* recessed into a side face, and the engaging recessed portion 21*a* and the engaging protruding portion 172*a* engaged each other to secure the card-type unit 101. In this way, when a card-type unit 101 is inserted, the card-type unit 101 can be reliably held by the sliding member 21, and the card-type unit 101 can be easily removed when the card-type unit 101 is ejected.

The sliding member 21 cannot be displaced to the outside in the width direction of the housing 11 when the card-type unit 101 is in the locked position, but can be displaced to the outside in the width direction of the housing 11 when the card-type unit 101 is in the ejection position. Therefore, the card-type unit 101 can be reliably held by the sliding member 21 in the locked position, and the card-type unit 101 can be held in the ejection position while allowing for easy removal of the card-type unit 101.

The pointed tip portion 15*b* of the guide rail 15 has a face in the middle of the housing 11 in the width direction which is an inclined face 15*c*. This face inclines outward in the width direction of the housing 11 as the rear end portion 11*r* is approached. Therefore, the guide groove 25 can move smoothly between the wide portion 15*a* and the pointed tip portion 15*b* when the sliding member 21 slides along the guide rail 15.

The card-type unit 101 includes a card 102 with contact pads 151 on one face, and a card tray 161 accommodating the card 102 so that the contact pads 151 are exposed. Thus, a card 102 is accommodated inside the card tray 16, which can be inserted into the card connector 1.

The card tray 161 has a top panel portion 162 facing the side of the card 102 opposite that of the contact pads 151, a front panel portion 165 extending upright from the front edge of the top panel portion 162 and facing the front end 111*f* of the card 102, a rear panel portion 163 extending upright from the rear edge of the top panel portion 162 and facing the rear end 11*r* of the card 102, a notch portion 165*a* formed in the front panel portion 165 so at least a portion of the front end 111*f* of the card 102 is exposed, and an elastic arm portion 166 disposed near the rear panel portion 163 and biasing the card 102 forward to press the front end 111f of the card 102 into a portion of the front panel portion 165 other than the notch portion 165a, the card 102 being grasped longitudinally to expose the entire face of the card 102 on the terminal member 151 side. In this way, the card tray 161 can reliably secure the card 102 without damaging the components inside the card connector 1. This enables the card tray 161, and, by extension, the card connector 1, to be made more compact with a lower profile.

While a preferred embodiment of the Present Disclosure is shown and described, it is envisioned that those skilled in the art may devise various modifications without departing from the spirit and scope of the foregoing Description and the appended Claims.

What is claimed is:

1. A connector comprising:
   a housing accommodating a card-type unit having a terminal member on one face;
   a connecting terminal mounted in the housing and contacting the terminal member of the card-type unit;
   a card guiding mechanism having a sliding member holding a card-type unit inserted into the housing from the rear end portion towards the front end portion and sliding, and a biasing member biasing the sliding member towards the rear end portion, the card-type unit being held at a locked position with contact maintained between the terminal member of the card-type unit and the connecting terminal, and the biasing force of the biasing member moving the sliding member from a final end point towards the rear end portion and advancing the card-type unit to an ejection position when the card-type unit is moved towards the front end portion to the final end point by a push operation pushing the card-type unit held at the locked position towards the front end portion; and
   a cover member mounted in the housing covering the sliding member and at least a portion of the card-type unit inserted into the housing;
   wherein:
      the housing has a guide rail protruding from the upper face of the bottom wall portion and extending towards the rear end portion, the guide rail including a wide portion near the front end portion and a narrow portion near the rear end portion being narrower in width than the wide portion;
      the sliding portion has a recessed guide groove slidably engaging the guide rail; and
      the guide groove engaging the wide portion when the card-type unit is in the locked position, and the guide groove engaging the narrow portion instead of the wide portion when the card-type unit is in the ejection position.

2. The connector of claim 1, wherein the card-type unit has an engaging protruding portion protruding from a side face, and the sliding member has an engaging recessed portion recessed in a side face, the engaging recessed portion engaging the engaging protruding portion to hold the card-type unit.

3. The connector of claim 2, wherein the sliding member cannot become displaced outward in the width direction of the housing when the card-type unit is in the locked position, and can become displaced outward in the width direction of the housing when the card-type unit is in the ejection position.

4. The connector of claim 3, wherein the narrow portion of the guide rail has a side face in the center of the housing in the width direction, the side face being an inclined face becoming more inclined outward in the width direction of the housing as the rear end portion is approached.

5. The connector of claim 4, wherein the card-type unit includes a card having a terminal member on one face, and a card tray containing a card so as to expose the terminal member.

6. The connector of claim 5, wherein the card tray has a top panel portion facing the side of the card opposite that of the terminal member, a front panel portion extending upright from the front edge of the top panel portion and facing the front end of the card, a rear panel portion extending upright from the rear edge of the top panel portion and facing the rear end of the card, a notch portion formed in the front panel portion so at least a portion of the front end of the card is exposed, and a card holding spring portion disposed near the rear panel portion and biasing the card forward to press the front end of the card into a portion of the front panel portion other than the notch portion, the card being grasped longitudinally to expose the entire face of the card on the terminal member side.

* * * * *